Aug. 28, 1934.　　　S. B. HASELTINE　　　1,971,407
FRICTION SHOCK ABSORBING MECHANISM
Filed June 19, 1929
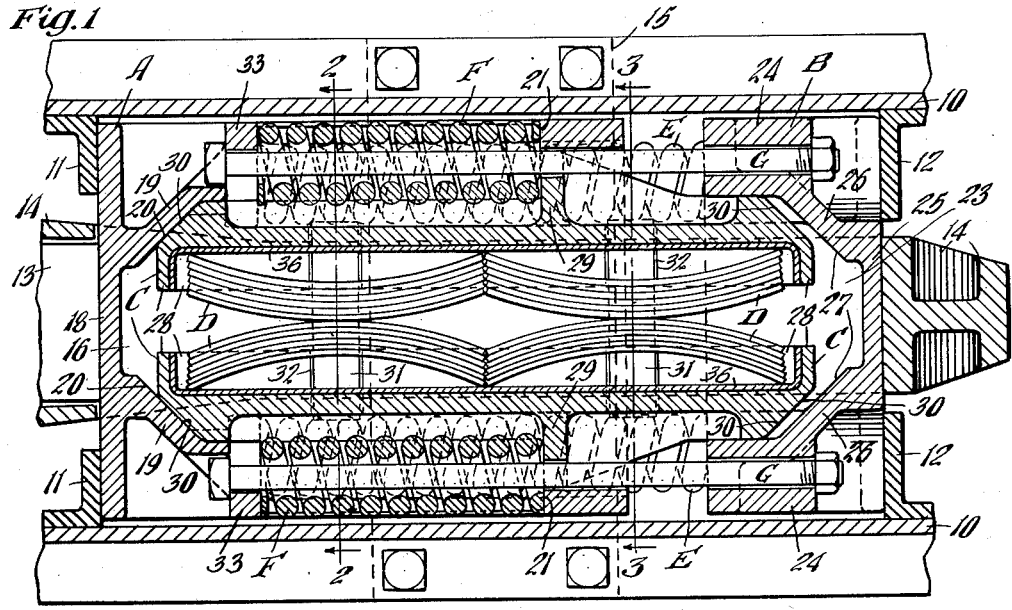
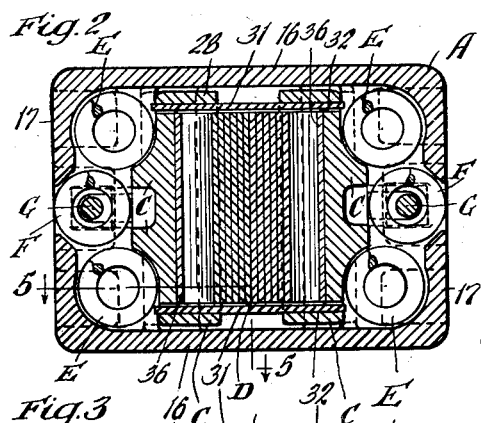
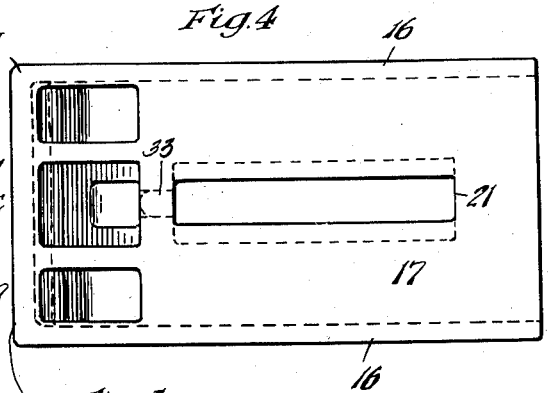
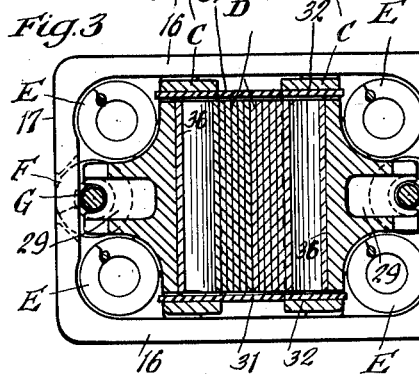
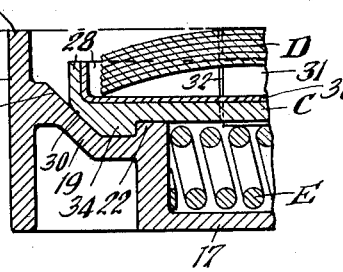
Witness
Wm. Geiger
Inventor
Stacy B. Haseltine
By Joseph Harris
His Atty.

Patented Aug. 28, 1934

1,971,407

UNITED STATES PATENT OFFICE 1,971,407

FRICTION SHOCK ABSORBING MECHANISM

Stacy B. Haseltine, Chicago, Ill., assignor to W. H. Miner, Inc., Chicago, Ill., a corporation of Delaware Application June 19, 1929, Serial No. 372,141

8 Claims. (Cl. 213—24)

This invention relates to improvements in friction shock absorbing mechanisms.

One object of the invention is to provide a friction shock absorbing mechanism, especially adapted for railway draft riggings, having light initial action produced by spring resistance means, and ultimate high capacity produced by friction wedge means.

Another object of the invention is to provide a friction shock absorbing mechanism including a pair of laterally movable spring resisted members, means for forcing said members toward each other to compress the spring resistance including end followers movable toward each other and having frictional engagement with said laterally movable members, and separate spring resistance means opposing relative approach of said end followers.

A further object of the invention is to provide a friction shock absorbing mechanism including a pair of longitudinally disposed members having laminated plate spring resistance means interposed therebetween opposing lateral approach of the same; means for forcing said members laterally toward each other, including relatively movable end followers; and additional spring reresistance means opposing relative approach of the end followers.

A more specific object of the invention is to provide a friction shock absorbing mechanism of the double ended type, including a pair of spaced, longitudinally disposed members having wedge faces at opposite ends thereof; laminated plate springs interposed between said members opposing lateral approach of the same; front and rear follower members having wedge faces cooperating with the wedge faces of the longitudinally disposed members to wedge the latter inwardly toward each other upon relative approach of the followers; and spring resistance means opposing relative movement of the followers.

Still another object of the invention is to provide a friction shock absorbing mechanism of the character indicated in the preceding paragraph wherein the wedge faces of one of the followers are normally spaced from the wedge faces at the corresponding ends of the longitudinally disposed members to provide for a certain amount of relative movement of the followers without actuation of the said longitudinally disposed members, during the first part of the compression stroke, to produce relatively light initial resistance of the mechanism.

Other objects of the invention will more clearly appear from the description and claims hereinafter following.

In the drawing, forming a part of this specification, Figure 1 is a horizontal, longitudinal, sectional view of a portion of the underframe structure of a railway car, illustrating my improvements in connection therewith. Figures 2 and 3 are vertical, transverse, sectional views corresponding respectively to the lines 2—2 and 3—3 of Figure 1. Figure 4 is a side elevational view of one of the follower members employed in connection with my improved shock absorbing mechanism. And Figure 5 is a detailed sectional view, partly broken away, corresponding substantially to the line 5—5 of Figure 2.

In said drawing, 10—10 indicate channel-shaped center or draft sills of a railway car underframe, to the inner sides of which are secured front stop lugs 11—11 and rear stop lugs 12—12. The inner end portion of the coupler shank is indicated by 13 and has operatively connected thereto a hooded yoke 14 of well known form. My improved shock absorbing mechanism is operatively disposed within the yoke and the yoke in turn is supported by a saddle plate 15 detachably secured to the draft sills 10.

My improved shock absorbing mechanism comprises broadly a front follower A; a rear follower B; a pair of longitudinally disposed, laterally movable side members C—C; a laminated spring resistance means D between the laterally movable members; spring resistance means E—E at opposite sides of the laterally movable members and cooperating with the followers; a pair of spring resistance members F—F; and a pair of retainer bolts G—G.

The front follower A is in the form of a substantially rectangular box-like casting having spaced, horizontally disposed top and bottom walls 16—16; longitudinally extending spaced side walls 17—17 and a transverse, vertical front end wall 18 cooperating with the stop lugs 11 in the manner of the usual front follower. At the front end of the casing, the side walls 17 are inwardly inclined as indicated at 19—19 to provide opposed interior wedge faces 20—20 diverging rearwardly of the mechanism. Adjacent the inner end of the casing, the side walls are provided with central spring abutments 21—21 for a purpose hereinafter pointed out. Adjacent the front end, the top and bottom walls of the casing are provided with stop shoulders 22—22 adapted to cooperate with the side members C—C to limit rearward movement of the same with respect to the follower casing A. As most clearly shown in Figures 2, 3, and 4, the side walls 17 of the casing A are interiorly recessed between the top and bottom sides of the casing to accommodate the outer sides of the spring resistance elements F—F, the recesses opening through the side walls of the casing as most clearly shown in Figure 4.

The rear follower B is in the form of a hollow casing having spaced top and bottom walls 23—23, spaced vertical side walls 24—24 and a transverse, rear end wall 25 cooperating with the rear stop lugs 12 of the draft sills. As shown, the side walls 24 of the casing are relatively thick and inclined wall portions 26—26 are provided between the end wall 25 and the main portion of the side walls 24, the inclined wall sections 26 presenting opposed interior wedge faces 27—27 converging rearwardly of the mechanism.

The side members C—C are of similar design, and are arranged lengthwise of the mechanism between the front and rear followers A and B. Each side member is in the form of a relatively heavy rectangular plate having inturned top, bottom and end flanges 28—28 to provide a pocket for the laminated plate springs D. On the outer side each plate C is provided with a laterally extending lug 29 between the ends thereof adapted to form an abutment for the inner end of the corresponding spring resistance element F. Each plate C is provided with wedge faces 30—30 at the opposite ends thereof correspondingly inclined to and adapted to cooperate respectively with the wedge faces 20 and 27 of the front and rear followers at the same side of the mechanism. As most clearly shown in Figure 1, the stop lug 29 of each side member C is so disposed that the front face of the same is in alinement with the front face of the abutment 21 of the casing A when the parts are in the full release position with the wedge face 30 at the front end of the side member engaging the wedge face 20 of the front follower.

The laminated plate spring resistance D comprises four spring members, arranged in pairs at opposite sides of the mechanism and interposed between the two side members C. Each laminated plate spring is composed of a plurality of curved spring plates arranged lengthwise of the mechanism with the convex inner surface of the laminated plate spring in engagement with the opposed convex curved surface at the inner side of the laminated plate spring at the opposite side of the mechanism. As is shown in Figure 1, the two members of each pair of laminated plate springs are arranged in end to end relation. The members of each pair are seated in the pocket of the corresponding side member C and are thus held assembled with the mechanism. In order to protect the members C from wear, the pocket of each member is provided with a flanged liner 36 fitting the walls thereof. The laminated springs are held against accidental displacement by relatively narrow wear plates 31—31 disposed above and below the same and spanning the space between the members C. As shown, the plates 31 are seated in transverse slots 32—32 provided at the top and bottom of the side members and the flanges of the liners are notched to accommodate the plates 31 so that they are flush with the liners. As will be evident, the bottom plates 31 support the laminated plate springs and prevent the same from accidentally dropping between the members C.

The spring resistance means E comprises four coils arranged in pairs at opposite sides of the mechanism and interposed between the front and rear followers, the coils being disposed at the four corners of the followers. The spring resistance elements F—F are arranged lengthwise of the mechanism at opposite sides of the pair of side members and each element is interposed between abutment means 33 at the front end of the front follower and the abutment means 21 at the inner end of the follower. As shown in Figure 2, the spring resistance elements F—F are interposed between the top and bottom spring members of the spring resistance E at the same side of the mechanism and are accommodated within the recesses at the sides of the casing A. The inner end of each spring element F also bears on the lug 29 of the corresponding side member. As will be evident, expansion of the spring resistance elements F is limited in extent to the spacing between the abutments 33 and 21. The spacing between these abutments is such that the rear ends of the side members C will be spaced from the wedge faces 27 of the rear follower B. In order to prevent accidental displacement of the side members C lengthwise of the mechanism, each side member is provided with a shoulder 34 at the forward end thereof, engaging with the shoulder 22 at the same side of the casing A. As will be evident, by engagement of the shoulders 22 and 34 with each other, the full release position of the members C will be positively determined and the position thereof will be that illustrated in Figure 1.

The mechanism is held assembled and of overall uniform length by the retainer bolts G which are disposed at opposite sides of the mechanism and have their front and rear ends anchored respectively to the front follower casing A and the rear follower casing B, the shanks of the bolts extending through alined openings in the walls 24 of the rear follower B and openings in the lugs 29 of the side members C. The parts are preferably so adjusted when assembled that the spring resistance elements E and the laminated springs D are under initial compression in the full release position of the mechanism.

The operation of my improved shock absorbing mechanism, during either a buffing or draft action, is as follows: The front and rear follower casings A and B will be moved relatively inwardly toward each other lengthwise of the mechanism. During the first part of the compression stroke, the side members C will remain stationary with respect to the front follower A while the wedge faces 30 at the rear ends of the side members and the wedge faces 27 of the follower B approach each other. During this action, the spring elements E only will be compressed, thereby providing light, preliminary resistance during the initial compression of the mechanism. During the continued relative movement of the front and rear followers, the wedge faces 30 at the rear ends of the side members will be engaged by the wedge faces 27 of the follower B. After engagement of these wedge faces, the side members C will be wedged laterally inwardly toward each other by the wedge faces of the front and rear followers which cooperate with the wedge faces 30 at the front and rear ends of the side members. As the side members are forced laterally toward each other, the laminated plate spring resistance means D will be compressed, thereby greatly increasing the resistance offered. The resistance will further be augmented by slippage of the wedge faces of the followers on the wedge faces 30 of the side members, the followers in their relative approach moving inwardly longitudinally on the wedge faces 30. Due to the inward movement of the follower A with respect to the side members C, lengthwise of the mechanism, the spring resistance elements F will also be compressed between the abutments 33 of the front follower and the lugs 29 of the side members. Compression of the mechanism will be limited by engagement of the inner end of the front follower casing A with the front end of the rear follower casing. The parts are preferably so proportioned that the opposite ends of the side members C will also engage the end walls of the followers A and B when the followers engage each other. When the parts engage each other, as pointed out, the spring resistance means D, E and F will be relieved from further compression and the followers A and B, together with the side members C, form column load transmitting means for transmitting the actuating force directly to the stop lugs of the draft sills.

In release of the mechanism, when the actuating force is reduced, the expansive action of the spring elements E will force the followers A and B apart, the laminated plate spring means D in returning to its normal condition will separate the side members C, and the spring elements F will force the side members C rearwardly with respect to the front follower A by engagement with the lugs 29 until expansion of these elements is limited by engagement with the fixed abutments 21 of said follower. Further accidental rearward displacement of the members C with respect to the follower casing A will be positively prevented by engagement of the shoulders 34 of said members with the shoulders 22 of the follower A. After expansion of the spring elements F has been limited, expansion of the spring elements E continues, thereby returning the followers A and B to the separated condition shown in Figure 1, outward movement of the followers with respect to each other being limited by the retainer bolts G.

From the preceding description taken in connection with the drawing, it will be evident that I have provided a simple and efficient shock absorbing mechanism of high capacity, having graduated action including light, preliminary spring resistance followed by heavier combined spring and frictional resistance. By employing the laminated plate springs between the side members, maximum capacity spring resistance is obtained opposing lateral approach of the side members, in addition to the spring resistance offered by the coil springs employed. It is further pointed out that in addition to the frictional resistance provided between the cooperating wedge faces of the front and rear followers and the side members, frictional resistance is also obtained due to slippage of the plates of the laminated springs on each other, while the springs are being flexed during compression of the mechanism.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a pair of spaced side members; of spring means opposing lateral approach of the side members; means for forcing said side members toward each other including followers at opposite ends of said side members; spring resistance means directly opposing relative approach of said followers toward each other; and additional spring resistance means directly opposing relative movement of only one of said followers and the side members in a direction lengthwise of the mechanism.

2. In a friction shock absorbing mechanism, the combination with a pair of spaced side members; of yielding means opposing relative movement of said side members laterally toward each other; end followers having inwardly acting wedge means thereon cooperating with the side members; spring resistance means directly opposing relative movement of said followers; additional spring resistance means directly opposing relative movement of one of said followers and said side members lengthwise of the mechanism; and means for limiting expansion of said additional spring resistance means before full expansion of said first named spring resistance means, thereby spacing the other follower from the corresponding ends of the side members in full release position of the mechanism to provide for light, preliminary action of the mechanism during compression thereof, before said side members are actuated.

3. In a friction shock absorbing mechanism, the combination with a pair of longitudinally disposed spaced side members each having abutment means thereon; of laminated plate spring means opposing lateral approach of said side members, the plates of said spring members being disposed lengthwise of the mechanism; front and rear follower members having laterally inwardly acting wedge means thereon coacting with the opposite ends of said side members, one of said followers having spaced abutment means thereon, spring resistance means interposed between said spaced abutment means and cooperating with the abutment means of the side members; means interposed between the front and rear follower members yieldingly opposing relative approach of the same; and means for limiting separation of the front and rear followers in release after said spring resistance means has been limited in its expansion, thereby spacing the wedge acting means of one of said followers from the corresponding ends of the side members to provide for a predetermined amount of light, preliminary action of the mechanism during a compression stroke.

4. In a friction shock absorbing mechanism, the combination with spaced side members movable laterally toward each other; of spring means opposing lateral approach of said side members; end followers movable toward and away from each other; spring means directly opposing relative approach of said followers; cooperating wedge means on said side members and followers for forcing the side members laterally toward each other upon relative approach of said followers; and abutment means on said followers having shouldered engagement with the side members for limiting lateral separation of said side members, before the followers have been separated to their full extent lengthwise of the mechanism to effect spacing of one of said followers from the cooperating wedge means of the side members when the followers are separated to their full extent, whereby said followers are movable relatively toward each other to a wedging engagement with said side members, to provide preliminary action during which said second named spring means only is compressed.

5. In a friction shock absorbing mechanism, the combination with a pair of spaced side members having wedge faces at opposite ends thereof; of spring resistance means opposing lateral approach of said side members; end followers having laterally inwardly acting wedge faces cooperating with the wedge faces of said side members; means for limiting relative separation of said side members and holding the same against such lateral separation during an appreciable amount of the compression stroke of the mechanism; means for limiting relative separation of said end followers in a direction lengthwise of the mechanism with the wedge faces of said respective followers spaced apart a distance greater than the spacing between the wedge faces at the respective ends of the side members, thereby providing a predetermined amount of relative movement between the followers before said wedge faces become active; and spring means yieldingly resisting relative approach of said end followers during the entire compression stroke of the mechanism, said last named spring only being compressed during said predetermined amount of the compression stroke while said side members are held against lateral separation.

6. In a friction shock absorbing mechanism, the combination with a pair of spaced side members having wedge faces at opposite ends and flat outer guide faces parallel to the longitudinal axis of the mechanism; of spring resistance means opposing relative lateral approach of said side members; end followers, each having opposed flat interior guide faces parallel to the longitudinal axis of the mechanism and engaged by the outer guide faces at the corresponding ends of the side members, said followers also having opposed interior wedge faces adapted to engage the wedge faces of the side members; means for limiting relative separation of said end followers in a direction lengthwise of the mechanism with the wedge faces of said respective followers spaced apart a distance greater than the spacing between the wedge faces at the respective ends of the side members; and means resisting relative approach of said end followers.

7. In a friction shock absorbing mechanism, the combination with spaced side members movable laterally toward each other; of spring means opposing lateral approach of said side members; end followers movable toward and away from each other; spring means directly opposing relative approach of said followers; cooperating wedge means on said side members and followers for forcing the side members laterally toward each other upon relative approach of said followers; and means for anchoring said side members to one of said followers to limit longitudinal relative movement of the follower and side members away from each other and to hold the wedge means of said side members and the other follower separated when the mechanism is fully released.

8. In a friction shock absorbing mechanism, the combination with spaced side members movable laterally toward each other; of spring means opposing lateral approach of said side members; end followers movable toward and away from each other; spring means directly opposing relative approach of said followers; cooperating wedge means on said side members and followers for forcing the side members laterally toward each other upon relative approach of said followers; means for limiting relative lateral separation of said side members; and means for anchoring said side members to one of said followers to limit longitudinal relative movement of the follower and side members away from each other and to hold the wedge means of said side members and the other follower separated when the mechanism is fully released.

STACY B. HASELTINE.

CERTIFICATE OF CORRECTION.

Patent No. 1,971,407.  August 28, 1934.

STACY B. HASELTINE.

It is hereby certified that error appears in the printed specification of the above numbered patent requiring correction as follows: Page 3, line 142, claim 4, before the word "wedging" insert predetermined extent before coming into operative; and that the said Letters Patent should be read with this correction therein that the same may conform to the record of the case in the Patent Office.

Signed and sealed this 25th day of September, A. D. 1934.

Leslie Frazer (Seal)  Acting Commissioner of Patents.